Figure 1:
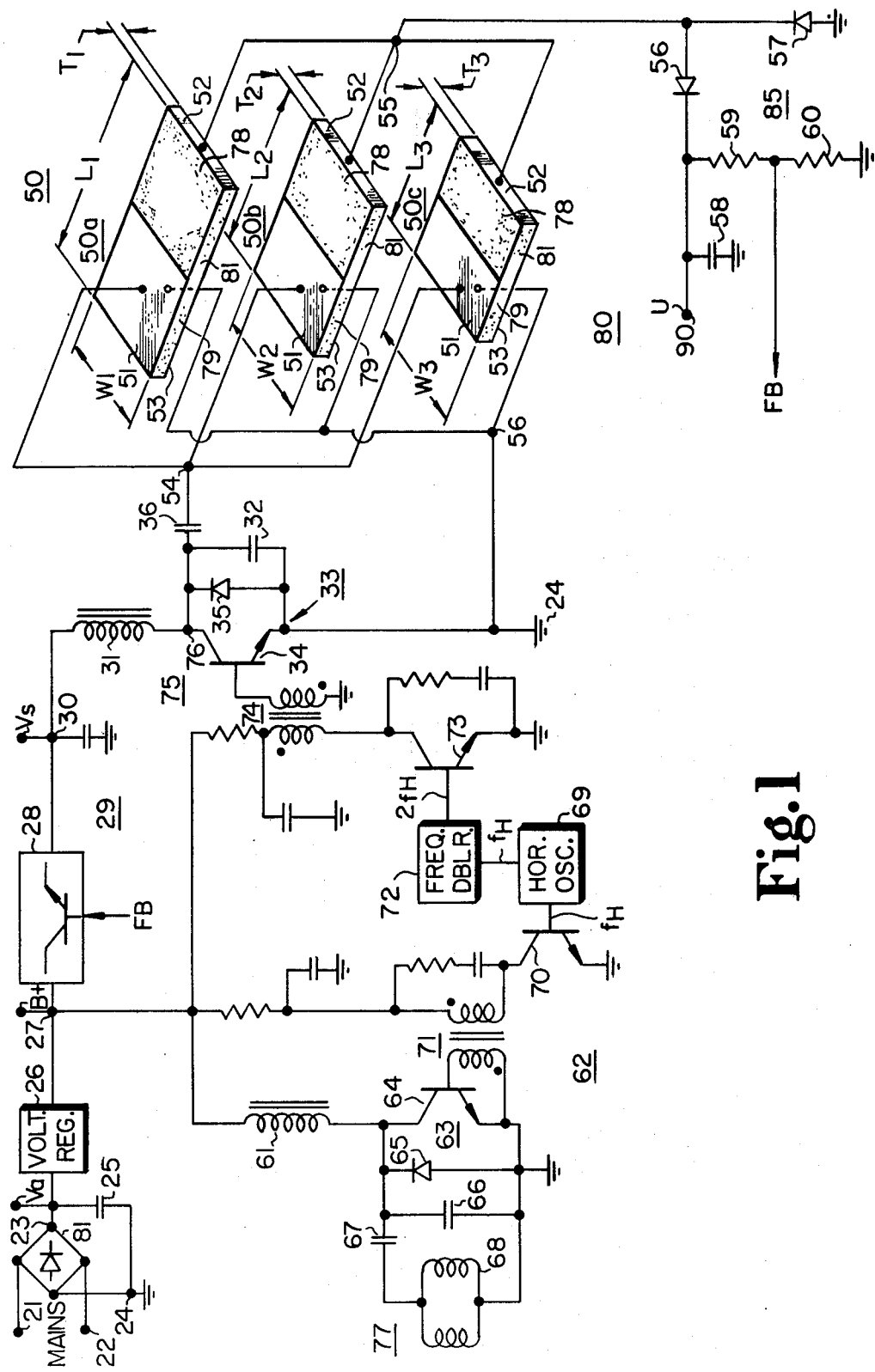

United States Patent [19]

Lim

[11] Patent Number: 4,459,505

[45] Date of Patent: Jul. 10, 1984

[54] PIEZOELECTRIC ULTOR VOLTAGE GENERATOR FOR A TELEVISION RECEIVER

[75] Inventor: Chong C. Lim, Hamilton Square, N.J.

[73] Assignee: RCA Corporation, New York, N.Y.

[21] Appl. No.: 383,033

[22] Filed: May 28, 1982

[51] Int. Cl.³ .......................................... H01L 41/08
[52] U.S. Cl. .................................. 310/318; 310/316
[58] Field of Search ...................... 310/316, 318, 359

[56] References Cited

U.S. PATENT DOCUMENTS

| 3,562,563 | 2/1971 | Schafft | 310/318 X |
| 3,657,579 | 4/1972 | Kramer | 310/318 |
| 3,683,210 | 8/1972 | Kawada | 310/8.1 |
| 3,694,674 | 9/1972 | Inoue | 310/8.2 |
| 3,707,636 | 12/1972 | Inoue | 310/318 |
| 3,896,401 | 7/1975 | Yano et al. | 310/318 X |
| 4,054,806 | 10/1977 | Moriki et al. | 310/318 |

FOREIGN PATENT DOCUMENTS 51-6492 2/1976 Japan.
1493447 11/1977 United Kingdom.

OTHER PUBLICATIONS

"Electronics Engineering Handbooks", 1975, by Donald G. Fink and Alexander A. McKenzie, McGraw Hill Book Co., New York, pp. 3-76 to 13-79 and pp. 25-118.

"Essentials of Radio-Electronics", 1961, by Morris Slurzberg and W. Osterheld, p. 149.

Primary Examiner—Mark O. Budd
Attorney, Agent, or Firm—E. M. Whitacre; P. J. Rasmussen; J. J. Laks

[57] ABSTRACT

An ultor voltage generator for a television receiver includes a piezoelectric transformer arrangement constituting a plurality of piezoelectric transformer elements, each having input, output and common electrodes. The voltage gain characteristic of each element has a relatively narrow frequency bandwidth about its natural frequency of mechanical vibration. The plurality of piezoelectric transformer elements are electrically connected in parallel. The output electrodes are connected to a supply terminal of the arrangement, and the input electrodes and common electrodes are connected to input and common terminals, respectively, of the arrangement. A source of alternating voltage is coupled between the input and common terminals to generate a higher amplitude alternating output voltage between the supply and common terminals. The alternating output voltage is applied to a doubler rectifier to generate a DC ultor voltage for the television receiver picture tube. The natural frequencies of the plurality of piezoelectric transformer elements differ from one another substantially in order to produce a resultant voltage gain characteristic of the entire arrangement that is of significantly broader frequency bandwidth than that of any one of the constituent elements.

9 Claims, 4 Drawing Figures

PIEZOELECTRIC ULTOR VOLTAGE GENERATOR FOR A TELEVISION RECEIVER

This invention relates to a piezoelectric ultor voltage generator for a television display system.

A piezoelectric transformer in general is a device that transforms energy between mechanical and electrical energies. It may comprise a substrate of a fired ceramic, piezoelectric material, a pair of drive electrodes that are applied to opposite surfaces at one end of the substrate, and an output electrode that is applied to a surface at the other end of the substrate. The surfaces of the substrate under the drive electrodes are polarized in the direction of the thickness of the substrate, while the surface under the output electrode is polarized in the longitudinal direction. An AC drive voltage with a frequency equal to the natural frequency of mechanical vibration of the piezoelectric transformer is impressed between the drive electrodes to cause the substrate to vibrate mechanically at its natural frequency. The mechanical vibration is propagated along the the length of the substrate to produce an amplified AC voltage at the output electrode.

The voltage amplification or gain $A_v$ can be quite high, amplifying the amplitude of a sinewave input voltage by a factor of a thousand or more for a transformer with a high mechanical Q driven at its natural frequency $f_0$. Because of its high gain characteristic, a piezoelectric transformer may be used in a television receiver to generate the ultor voltage for the picture tube of the television receiver. If the drive frequency of the piezoelectric transformer is selected as the horizontal deflection frequency $f_H$ or some multiple thereof, the transformer may be constructed as a simple, compact and relatively inexpensive unit.

The output voltage of a piezoelectric transformer is at its maximum when the drive frequency is equal to the natural frequency $f_0$ of mechanical vibration. For a transformer with a high mechanical Q, the bandwidth of the voltage gain characteristic may be relatively narrow. A slight shift in the drive frequency away from the natural frequency $f_0$ can produce a relatively large decrease in the amplitude of the output voltage.

A feature of the invention is the use of a piezoelectric transformer arrangement that has a relatively wide bandwidth voltage gain characteristic and that does not sacrifice the large amplification factor needed in order to produce an ultor voltage for a television receiver. The need for a drive voltage source that is highly stable in frequency is thereby avoided.

In accordance with the invention, an ultor voltage generator for a television display system includes a piezoelectric transformer arrangement that has a plurality of individual transformer elements connected in parallel. To enable the resultant bandwidth of the arrangement to be relatively wide, the natural frequencies of mechanical vibration differ from one another substantially. Thus, even though the voltage gain characteristic of an individual element is relatively narrow, the resultant gain characteristic of the entire arrangement is relatively broad. Because the natural frequency of a piezoelectric transformer element is proportional to c/2L, where c represents the velocity of sound wave propagation through the substrate of the element, and where L represents the length of the element, the plurality of elements in the piezoelectric transformer arrangement can be made to have different natural frequencies by fabricating elements having different lengths.

Figure 2A:
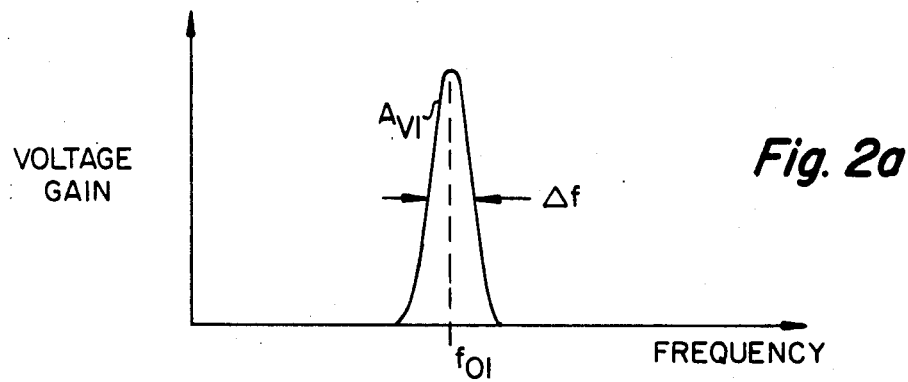
Figure 2B:
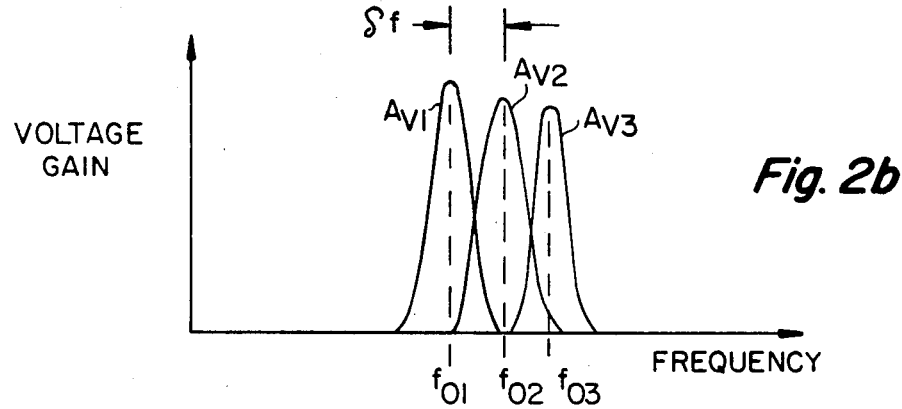
Figure 2C:
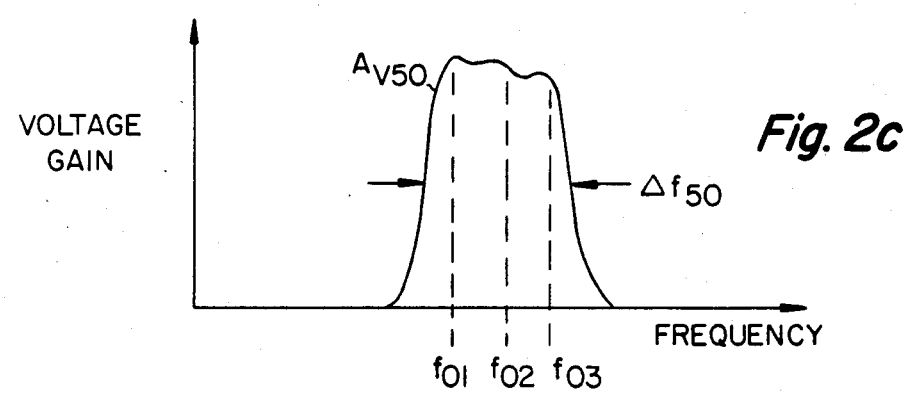

FIG. 1 illustrates a deflection circuit and piezoelectric ultor voltage generator for a television display system embodying the invention; and FIGS. 2a–2c illustrate voltage gain characteristics of both the individual elements and the entire piezoelectric transformer arrangement illustrated in FIG. 1.

In FIG. 1, a mains supply voltage is applied to terminals 21 and 22 of a full-wave bridge rectifier 81 to develop a DC voltage $V_a$ between an output terminal 23 and a current return terminal or ground 24. A filter capacitor 25 is coupled between terminals 23 and 24. The voltage $V_a$ is applied to a voltage regulator 26 to develop at a terminal 27 a B+ supply voltage for a horizontal deflection circuit 62.

Horizontal deflection circuit 62 comprises a horizontal oscillator 69 operating at the horizontal deflection frequency $f_H$, a horizontal driver transistor 70 coupled to the primary winding of a driver transformer 71, and a horizontal generator or output stage 77. Horizontal output stage 77 includes a trace switch 63 comprising a horizontal output transistor 64 and a damper diode 65, a retrace capacitor 66, and the series arrangement of a trace or S-shaping capacitor 67 and a horizontal deflection winding 68. Power for horizontal output stage 77 is obtained from the B+ voltage terminal 27 through an inductor 61, which may comprise a winding of a horizontal output or flyback transformer.

Operation of horizontal oscillator 69 generates a deflection rate, $f_H$, switching signal that is applied to the base of horizontal driver transistor 70. The horizontal rate switching of driver transistor 70 in turn produces the periodic horizontal rate switching of horizontal output transistor 64, thereby generating scanning current in horizontal deflection winding 68.

An ultor voltage generator 80 for the television receiver comprises a source 75 of alternating input voltage and a piezoelectric transformer arrangement 50 coupled to input voltage source 75 and to a high voltage rectifier arrangement 85 to generate a DC ultor voltage U at an ultor terminal 90.

Alternating input voltage source 75 includes an LC circuit comprising an inductor 31 and a capacitor 32 coupled in series between a voltage supply terminal 30 and ground. A controllable voltage supply 29 develops a direct voltage $V_s$ at terminal 30. A switch 33, comprising a transistor 34 and an antiparallel diode 35, is coupled between ground and a terminal 76, the junction of inductor 31 and capacitor 32. Transistor 34 is switched at a selected frequency such as the horizontal deflection frequency $f_H$ or some multiple thereof, to produce a half sinewave voltage pulse across capacitor 32 between terminal 76 and ground.

In the circuit of FIG. 1, the switching frequency of transistor 34 is illustratively at a $2f_H$ rate. To obtain the $2f_H$ switching of transistor 34, the $f_H$ output of horizontal oscillator 69 is applied to a frequency doubler 72, the output of which is applied to the base of a transistor 73. The collector of transistor 73 is coupled to a primary winding of transformer 74 that has a secondary winding coupled to the base of transistor 34. The resonant frequency of inductor 31 and capacitor 32 may be selected as the $2f_H$ switching frequency of transistor 34. At a nominal 50% on/off duty cycle for switch 33, a half sinewave voltage pulse of duration $1/(4f_H)$ is developed at terminal 76. This pulse is AC coupled through a capacitor 36 to develop a half sinewave AC input voltage pulse between an input terminal 54 and a common terminal 56 of piezoelectric transformer arrangement 50.

Piezoelectric transformer arrangement 50 constitutes three individual piezoelectric transformer elements 50a, 50b and 50c, connected in parallel. The substrate 78 of a piezoelectric transformer element, 50a, 50b or 50c, is made of a fired ceramic piezoelectric material such as a PZT-8 with a mechanical Q of 1,000 at zero PSI. The driver section 79 of an element includes an input electrode 51 and a common electrode 53 provided on opposite surfaces of the substrate 78. The voltage generator section 81 includes an output electrode 52 on an end face. The surfaces of the substrate in contact with electrodes 51 and 53 are polarized in the direction of the thickness, and the surface of substrate 78 in contact with electrode 52 is polarized in the longitudinal direction.

To connect the three piezoelectric transformer elements 50a–50c in parallel, each electrode of one element is connected to the same type electrode of the other two elements. The three input electrodes 51 are then coupled to the input terminal 54 of piezoelectric transformer arrangement 50, the output electrodes 52 to the supply terminal 55 and the common electrodes to the common terminal 56.

The alternating input voltage applied between terminals 54 and 56 produces by means of the piezoelectric effect a high amplitude alternating output voltage between terminals 55 and 56. The alternating output voltage is rectified by diodes 56 and 57 of a doubler rectifier arrangement 85 and filtered by a capacitor 58 to develop the DC ultor voltage U at ultor terminal 90. The inherent capacity exhibited by piezoelectric transformer arrangement 50 at terminal 55 functions as the capacitance needed for the doubler.

The output voltage of a piezoelectric element driven individually is at a maximum when the driving frequency equals $f_0$, the natural frequency of mechanical vibration of the element. The natural frequency, $f_0$, is inversely proprotional to the length L of the element. The voltage gain, $A_v$, when driven at that frequency is $A_{max}=A_0Q_ML/T$, where $A_0$ is a proportionality constant that is a function of the material properties of the piezoelectric element, $Q_M$ is the mechanical Q of the element, L is the length of the element, and T is the thickness of the element, assuming an open-circuited output and sinewave input and output voltages.

For a high mechanical Q element, the voltage gain $A_v$ exhibits a narrow bandwidth $\delta f$ about its natural frequency. As illustrated in FIG. 2a, the voltage gain $A_{v1}$ of piezoelectric element 50a, for example, has a narrow bandwidth $\Delta f=110$ Hz about its natural frequency $f_{01}$ of around $2f_H=31.5$ KHz.

Where only a single piezoelectric element is used in ultor voltage generator 80, manufacturing tolerances in the frequencies of horizontal oscillator 69 and other elements of alternating input voltage source 75 could combine to undesirably produce wide variations in ultor voltage U between different manufactured units of a television receiver. Similarly, instability in the frequency of operation of horizontal oscillator 69 and alternating input voltage source 75 could produce large drifts in ultor voltage U, away from its nominal voltage.

A feature of the invention is a piezoelectric ultor voltage generator 80 that provides a relatively unchanged ultor voltage when the drive frequency differs from the nominal or when the natural frequency of an individual piezoelectric element differs from the ideal.

In accordance with one aspect of the invention, the piezoelectrice transformer arrangement 50 comprises a plurality of individual elements 50a–50c constructed so as to produce a voltage gain characteristic $A_{v50}$, of the total arrangement that is of significantly broader bandwidth than that of each of the individual, constituent elements.

To produce a broad bandwidth $A_{v50}$, each of the parallelly connected elements 50a–50c significantly differ from one another in length, with the length $L_1$ of element 50a being, for example, the longest and length $L_3$ of element 50c being the shortest. Since the natural frequency of an individual element is inversely proportional to the length of the element, the voltage gain characteristics $A_{v1}$, $A_{v2}$, $A_{v3}$, of elements 50a, b, c, respectively, illustrated in FIG. 2b, will have center or natural frequencies $f_{01}$, $f_{02}$, $f_{03}$ that are offset from one another such that $f_{03}-f_{02}\approx f_{02}-f_{01}=\delta f$. The resultant gain characterisitic $A_{v50}$ of the entire transformer arrangement 50 is illustrated in FIG. 2c. The bandwidth $\Delta f_{50}$ of the resultant gain characteristic $A_{v50}$ is substantially greater than the bandwidth of about $\Delta f$ of an individual element. Since the maximum gain $A_{max}$ of an individual element is proportional to L/T, the maximum gain of each of the three elements may be kept equal, even though they differ in length, by maintaining the same ratio of length to thickness for each element.

When beam current loading at ultor terminal 90 of FIG. 1 loads down piezoelectric transformer arrangement 50, the resultant voltage gain characteristic $A_{v50}$, as well as the individual gain characteristics, decreases in maximum amplitude. To prevent the ultor voltage U from decreasing substantially with increasing beam current loading, controllable voltage source 29 increases the supply voltage $V_s$ to compensate for the deleterious effects produced, in effect, by the internal impedance of piezoelectric ultor voltage generator 80.

Controllable voltage source 29 includes a conventional series pass regulator circuit 28 coupled between B+ voltage terminal 27 and supply voltage terminal 30. The impedance of the series pass element within circuit 28 changes as a function of the change in a signal developed on a signal line FB fed to regulator circuit 28. The signal is representative of a selected variable within the television receiver for which it is desired to vary the amplitude of the voltage $V_s$ as a function thereof.

In FIG. 1, the selected variable is the ultor voltage U. By coupling signal line FB to the junction of voltage dividing resistors 59 and 60, negative feedback regulation of the ultor voltage U is achieved. As the ultor voltage U tends to decrease, for example, with increased beam current loading of piezoelectric transformer arrangement 50, the negative feedback provided on signal line FB increases the supply voltage $V_s$ enough to maintain the ultor voltage relatively unchanged.

The following is an example of a piezoelectric transformer arrangement that is part of an ultor voltage generator 80 used in a modified CTC-115 color television chassis manufactured by RCA Corporation.

The composition of each element 50a, b, or c is a lead zirconate titanate. The nominal dimensions of element 50a are $L_1=2.227$ inches, $T_1=0.2$ inch, $W_1=0.787$ inch. The nominal dimensions of element 50b and $L_2=2.22$ inches, $T_2=0.2$ inch, $W_2=0.787$ inch. The nominal dimensions of element 50c are $L_3=2.213$ inches, $T_3=0.2$ inch, $W_3=0.787$ inch. The natural frequencies of the three elements are nominally $f_{01}=31{,}368$ Hz, $f_{02}=31{,}468$ Hz, $f_{03}=31{,}568$ Hz. The bandwidth of each individual element is approximately $\Delta f = 110$ Hz. The bandwidth of the entire transformer arrangement is approximately $\Delta f_{50} = 310$ Hz.

What is claimed is:

1. A piezoelectric ultor voltage generator for a television display system, comprising:
    a source of input voltage;
    a piezoelectric transformer arrangement constituting at least first and second piezoelectric transformer elements mechanically isolated from each other, each having an input electrode and an output electrode, the voltage gain characteristic of each element having a relatively narrow bandwidth about its natural frequency of mechanical vibration, the output electrodes of the two elements being coupled to a supply terminal of said arrangement, the input electrodes of the two elements being coupled to said source to generate an alternating output voltage at said supply terminal;
    an ultor terminal; and
    a rectifier arrangement coupled to said supply terminal and to said ultor terminal for generating an ultor voltage from said output voltage,
    wherein the natural frequencies of the two elements are selected to be near that of said source of input voltage to provide large voltage amplification and are further selected to differ from each other by a significant amount that produces a resultant voltage gain characteristic of said transformer arrangement that is of significantly broader bandwidth than that of each of the constituent elements.

2. A generator according to claim 1 wherein the length of one element differs from the length of the other element so as to produce the required difference between the natural frequencies of the two elements.

3. A generator according to claims 1 or 2 wherein each of the two piezoelectric elements includes a common electrode, each electrode of one element being coupled to the same type electrode of the other element.

4. A generator according to claims 1 or 2 including a deflection winding and a deflection generator coupled thereto to generate scanning current in said deflection winding, wherein the frequency of said input voltage is selected substantially as the deflection frequency or some multiple thereof.

5. An ultor voltage generator according to claim 4 wherein said input voltage source comprises a source of direct voltage, an LC circuit coupled to said direct voltage source, and switching means coupled to said LC circuit and operated at said selected frequency to excite said LC circuit into developing said input voltage.

6. An ultor voltage generator according to claim 5 including means coupled to said direct voltage source and responsive to a signal representative of a variable within said television display system for varying the amplitude of said direct voltage as said signal varies so as to concurrently vary the amplitude of said output voltage.

7. An ultor voltage generator according to claim 6 wherein said variable comprises said ultor voltage and wherein said signal provides negative feedback to said direct voltage amplitude varying means for opposing said variations in said ultor voltage.

8. An ultor voltage generator according to claim 1 wherein said source of input voltage is subject to instability that produces a range of frequencies of operation and wherein said broader bandwidth of said transformer arrangement encompasses said range.

9. An ultor voltage generator according to claim 1 wherein said source of input voltage includes a deflection winding and a deflection generator coupled thereto and operating at a nominal frequency to generate scanning current in said deflection winding, wherein the frequency of operation of said deflecting generator is subject to variation and wherein the natural frequencies of the two elements are selected to produce a broader bandwidth voltage gain characteristic that provides a relatively unchanged ultor voltage with said variation.

* * * * *